US006688439B2

(12) United States Patent
Bhattacharya et al.

(10) Patent No.: US 6,688,439 B2
(45) Date of Patent: Feb. 10, 2004

(54) VIBRATION DAMPING SYSTEM AND A METHOD OF DAMPING VIBRATIONS

(75) Inventors: Bishakh Bhattacharya, Calcutta (IN); Jem Rongong, Stockport (GB); Geoffrey R Tomlinson, Stockport (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/928,219

(22) Filed: Aug. 13, 2001

(65) Prior Publication Data

US 2003/0213660 A1 Nov. 20, 2003

(30) Foreign Application Priority Data

Aug. 16, 2000 (GB) .............................................. 0020082

(51) Int. Cl.$^7$ ........................... F01D 25/04; F01D 25/06
(52) U.S. Cl. ..................... 188/267; 267/136; 267/137; 188/378
(58) Field of Search ..................... 188/267, 378–380, 188/268; 267/136, 137; 428/212, 611, 692, 694 BM, 694 TS, 694 TM, 694 MM; 416/500; 415/119; 60/794; 181/207; 244/53 R, 17.11; 248/550

(56) References Cited

U.S. PATENT DOCUMENTS

| | | | | |
|---|---|---|---|---|
| 3,817,356 A | * | 6/1974 | Dahlguist | ..................... 188/378 |
| 4,023,651 A | * | 5/1977 | Healiss | ..................... 188/378 |
| 4,406,642 A | * | 9/1983 | McNall | |
| 5,300,355 A | * | 4/1994 | Mifune et al. | |
| 5,674,135 A | * | 10/1997 | Franco et al. | ............... 188/268 |
| 5,810,126 A | * | 9/1998 | Kordonsky et al. | .......... 188/267 |
| 5,855,353 A | * | 1/1999 | Shaffer et al. | |
| 5,965,249 A | * | 10/1999 | Sutton et al. | |
| RE36,806 E | * | 8/2000 | Landin et al. | |
| 6,191,510 B1 | * | 2/2001 | Landin et al. | |
| 6,285,525 B1 | * | 9/2001 | McCutcheon et al. | |
| 6,547,049 B1 | * | 4/2003 | Tomlinson | ................... 188/379 |

FOREIGN PATENT DOCUMENTS

| | | |
|---|---|---|
| GB | 1415304 P | 11/1975 |
| GB | 2216601 A | 10/1989 |
| GB | 2221743 A | 2/1990 |
| GB | 2222279 A | 2/1990 |
| GB | 2251049 A | 6/1992 |
| GB | 2313170 A | 11/1997 |

OTHER PUBLICATIONS

Bhattacharya, Vibration Suppression of Slender Composite Beams Using Magnetostrictive Actuation, Journal of Aeronautical Society of India, 1996, vol. 48 No. 2.

(List continued on next page.)

Primary Examiner—Douglas C. Butler
(74) Attorney, Agent, or Firm—W. Warren Taltavull; Manelli, Denison & Selter PLLC

(57) ABSTRACT

A vibration damping system (8) wherein the system (8) comprises a magnetism generating medium (12) and a magnetism energy dissipating medium (16) whereby, in use, vibration of the magnetism generating medium (12) generates a magnetic field, the magnetism generating medium (12) and the magnetism energy dissipating medium (16) being so disposed with respect to each other that the magnetic field is then dissipated by the magnetism energy dissipating medium (16) thereby damping the vibrations of the magnetism generating medium (12).

30 Claims, 2 Drawing Sheets

OTHER PUBLICATIONS

Agnes, Nonlinear Peizoelectric Vibration Absorbers, Smart Materials and Structures, 1996, vol. 5 No. 5.

Nashit, Vibration Damping, John Wiley and Sons, 1985.

A.E. Clark, Magnetostrictive Rare Earth–Fe2 Compounds, Ferromagnetic Materials, 1980, North Holland Publishing Co.

Anjanappa, Magnetostrictive Mini Actuators for Smart Structures Applications, Smart Materials and Structures, 1994, vol. 3 pp. 383–395.

Sandlund, Magnetostriction, Eleastic Moduli, and Coupling Factors of Composite Terfenol–D, Journal of Applied Physics, 1994, vol. 75 pp. 5656–5658.

Anjanappa, Magnetostrictive Particulate Actuators: Configuration, Modelling, and Characterisation, Smart Materials and Structures, 1997, vol. 6 pp. 393–402.

* cited by examiner

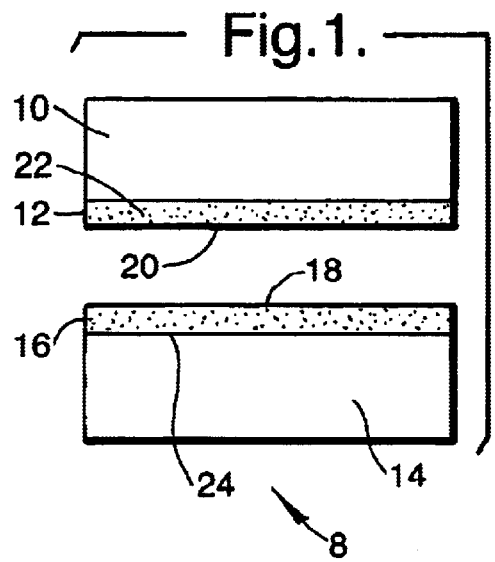
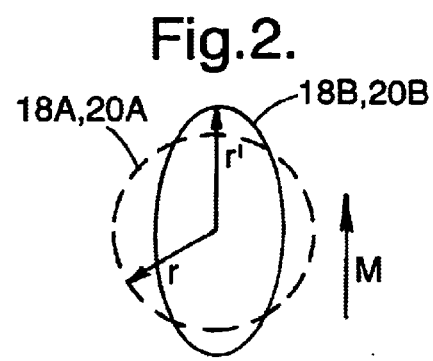
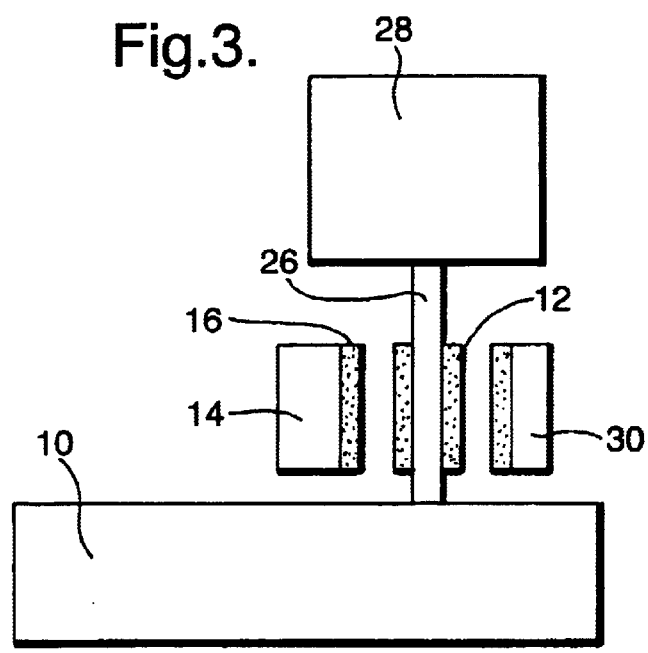
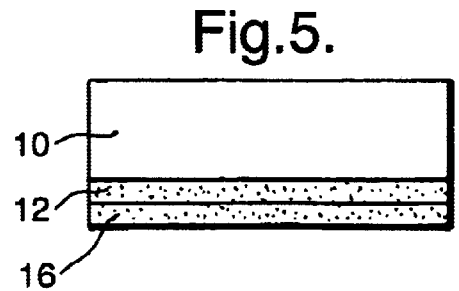

VIBRATION DAMPING SYSTEM AND A METHOD OF DAMPING VIBRATIONS

FIELD OF THE INVENTION

This invention relates to a system and a method for damping vibrations of structures, particularly although not exclusively, those structures undergoing a machining operation.

BACKGROUND OF THE INVENTION

During a machining operation, for instance milling a metallic component, it is common for chatter to occur if the tooling or workpiece are of insufficient rigidity. Chatter is the vibration of the milling tool relative to the workpiece which results in either a reduction in the quality of the surface finish being machined or an increase in the machining process time where a better surface finish is required. In the manufacture of aero-engine blisks this is of particular importance as the tough nature of the material, titanium, to be machined and the flexibility and low inherent damping of the workpiece severely curtails machining rates.

Current damping techniques include magnetostrictive actuators as disclosed in "Vibration suppression in slender composite beams using magnetostrictive actuation", Journal of Aeronautical Society of India, vol. 48, no. 2, 1996. However, this technique is disadvantaged by being an active system, requiring a power supply, wiring to induce a magnetic field and by incurring a weight penalty. Another damping technique uses piezoelectric shunts, as disclosed in "Non-linear piezoelectric vibration absorbers", Smart Materials and Structures, vol. 5, no. 5, 1996. Such shunts essentially convert mechanical strain, from vibrations, into electrical charge which is then dissipated via an electrical network thus attenuating vibration. This system is disadvantaged by requiring wire connections and added weight. A further damping technique uses visco-elastic material as disclosed in "Vibration damping", John Wiley and Sons, 1985, but suffers from a weight penalty and the difficulty of maintaining optimal environmental conditions for required performance.

SUMMARY OF THE INVENTION

It is the object of the present invention to provide a vibration damping system and a method for damping vibrations of vibrating structures which may accommodate irregular workpiece and tooling geometries, may operate in extreme environmental conditions, may be used where access is limited and which has a reduced weight penalty.

According to the present invention, there is provided a vibration damping system wherein the system comprises a magnetism generating medium and a magnetism energy dissipating medium whereby, in use, vibration of the magnetism generating medium generates a magnetic field, the magnetism generating medium and the magnetism energy dissipating medium being so disposed with respect to each other that the magnetic field is then dissipated by the magnetism energy dissipating medium thereby damping the vibrations of the magnetism generating medium.

Alternatively, the system comprises a body, the magnetism generating medium is applied to the body, so that, in use, when the body vibrates a magnetic field is generated by the magnetism generating medium, the magnetism generating medium and the magnetism energy dissipating medium being so disposed with respect to each other that the magnetic field is then dissipated by the magnetism energy dissipating medium thereby damping the vibrations of the body.

Preferably, the vibration damping system comprises a secondary structure, the magnetism energy dissipating medium is applied to the secondary structure and the secondary structure, in use, is in proximity to the body such that the vibrations of the body are damped.

Preferably, the secondary structure comprises magnetism energy dissipating medium and, in use, is in proximity to the body such that the vibrations of the body are damped. Alternatively, the magnetism energy dissipating medium is applied to the magnetism generating medium.

Preferably, the magnetism generating medium comprises magnetostrictive material. Alternatively, the magnetism generating medium comprises a matrix and a plurality of magnetostrictive particles dispersed within the matrix.

Preferably, the magnetism energy dissipating medium comprises a matrix and a plurality of magnetostrictive particles dispersed within the matrix.

Preferably, the magnetostrictive particles and the magnetostrictive material each comprise 30% Terbium, 70% Dysprosium and trace Iron. Alternatively, the magnetostrictive particles and the magnetostrictive material each comprise any one or more of the magnetic transition elements. Alternatively, the magnetostrictive particles and the magnetostrictive material each comprise any one or more of the rare earth materials. Alternatively, the magnetostrictive particles and the magnetostrictive material each comprise any one or more of the rare earth materials and any one or more of the magnetic transition elements.

Preferably the magnetism energy dissipating matrix comprises polyurethane. Alternatively, the magnetism energy dissipating medium comprises a matrix, the matrix comprises a visco-elastic magnetism energy dissipating matrix.

Preferably, the magnetism energy dissipating medium includes a visco-elastic magnetism energy dissipating matrix and the magnetism generating medium includes a binder matrix, the binder matrix having an elastic modulus greater than the elastic modulus of the visco-elastic dissipating matrix.

Preferably, each of the magnetostrictive particles has substantially the same magnetic orientation as the remainder thereof. Alternatively, each of the magnetostrictive particles is oriented substantially in the direction of the magnetic field.

Alternatively, the magnetostrictive particles are each of the same size.

Preferably, the vibrations imposed on the magnetism generating medium are derived from a machining process.

Alternatively, the vibrations imposed on the magnetism generating medium are derived from an acoustic source.

Preferably, the body is any one of the primary structure, the machine, the tool or any industrially manufactured item which undergoes some form of machining process. Alternatively, the body is a component of a gas turbine engine. Alternatively, the body is a component of an aircraft. Alternatively, the body is a vibrating rotating body.

Preferably, the magnetism generating medium is any one of the primary structure, the machine, the tool or any industrially manufactured item which undergoes some form of machining process. Alternatively, the magnetism generating medium is a component of a gas turbine engine. Alternatively, the magnetism generating medium is a component of an aircraft. Alternatively, the magnetism generating medium is a vibrating rotating body.

Preferably, a means for cooling the secondary structure is provided. Preferably, a means for cooling the magnetism energy dissipating coating is provided. Preferably, the means for cooling comprises any conventional cooling system as known in the art.

Preferably, a method of damping vibrations of a body wherein the method comprises the steps of:

(i) applying a magnetism generating medium to a body;

(ii) applying a magnetism energy dissipating medium to a secondary structure;

(iii) disposing the secondary structure in proximity to the body so that the magnetism generating coating and the magnetism energy dissipating medium are so disposed with respect to each other that the magnetic field is then dissipated by the magnetism energy dissipating medium thereby damping the vibrations of the body.

Preferably, the method of damping vibrations of the body comprises the further step of cooling the magnetism energy dissipating medium to optimise operational temperature of the magnetism energy dissipating medium.

Preferably, the method of damping vibrations of the body comprises the further step of cooling the secondary structure.

BRIEF DESCRIPTION OF THE DRAWINGS

The present invention will now be described, by way of example, with reference to the accompanying drawings in which:

FIG. 1 is a sectioned view of a generalised application of the present invention.

FIG. 2 is a sectioned view of an idealised magnetostrictive particle undergoing dilation under the effect of an applied magnetic field.

FIG. 3 is a second embodiment of the present invention showing an application of the present invention to the milling tool of a machine.

FIG. 5 shows a fourth embodiment of the present invention.

DETAILED DESCRIPTION OF THE INVENTION

Figure 4:
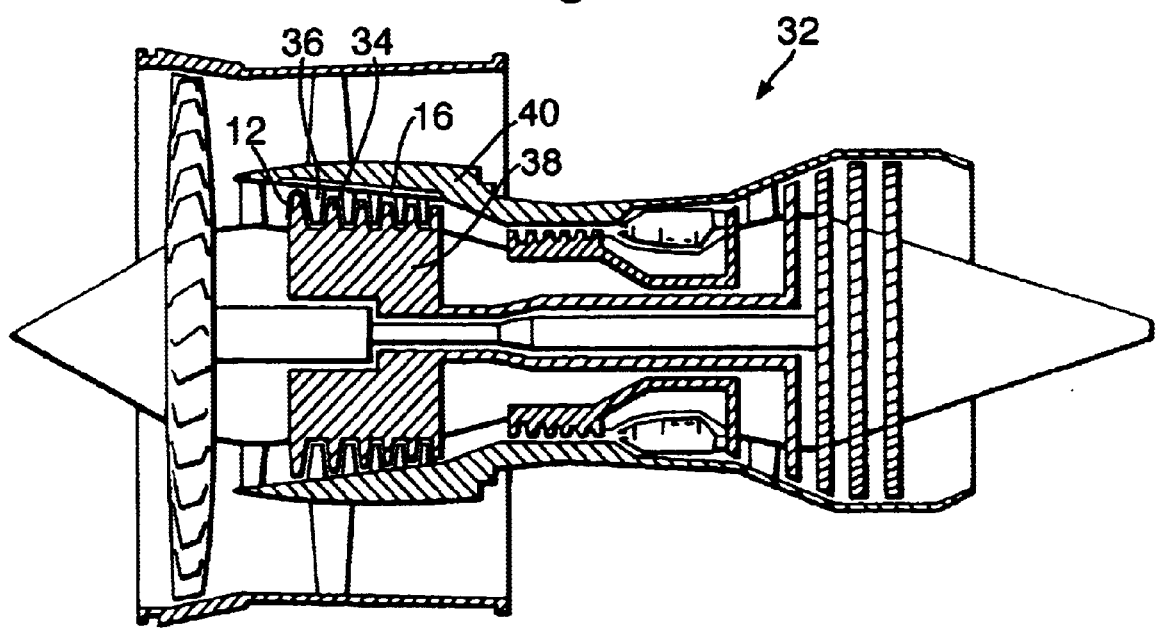
FIG. 4 is a third embodiment of the present invention showing the application of the present invention to gas turbine engine components.

With reference to FIG. 1, it can be seen that a vibration damping system 8 comprises a magnetism generating coating 12 applied to a body 10, in this case a primary structure 10. The magnetism generating coating 12 being a magnetism generating medium 12. The primary structure 10 is the vibrating structure to be damped. The system 8 also comprises a magnetism energy dissipating coating 16 which is applied to a secondary structure 14. The magnetism energy dissipating coating 16 being a magnetism energy dissipating medium 16.

In operation the secondary structure 14 is in proximity to the vibrating primary structure 10 where a magnetic field, induced by the magnetism generating coating 12, works in operative association with the magnetism energy dissipating coating 16. Thereby, the vibrations of the primary structure. 10 may be damped by transference of vibration energy to the magnetism energy dissipating coating 16 applied on the secondary structure 14 via the magnetic field. The magnetism generating coating 12 and the magnetism energy dissipating coating 16 work co-operatively and in accordance with the principle of magnetostriction.

Magnetostriction is a phenomenon where a material undergoes mechanical strain under the influence of a magnetic field and vice-versa. This physical property is found in materials containing magnetic transition elements such as, but not exclusively, Iron, Nickel and rare earth elements like Lanthanum and Terbium. Referring to FIG. 2, a particle 18, 20, of these materials normally comprise numerous small randomly oriented magnetic domains, which can rotate and align under the influence of an external magnetic field. Although the amount of magnetostriction is usually small; it has been shown (Clark, A. E., "Magnetostrictive rare earth-$Fe_2$ compounds", Ferromagnetic Materials, Vol. 1, Ch. 7, North Holland Publishing Co., 1980) that considerable magnetostriction in an alloy of Terbium, Dysprosium and Iron, which is commercially known as Terfenol-D™, is possible. Terfenol-D™ comprises approximately 30% Terbium and 70% Dysprosium and also traces of Iron.

Currently, magnetostrictive materials like Terfenol-D™ are being used in active damping of structural vibration as they can produce a large amount of actuation (around 2000 micro-strains) and have a stable performance over a frequency range of 0–10 kHz (as disclosed in Anjanappa, M. and Bi, J., "Magnetostrictive mini actuators for smart structure application", Smart Materials and Structures, Vol. 3, 1994, pp. 383–95).

Recently, actuators made from magnetostrictive Terfenol-D™ particles embedded in a compliant polymer have been reported (Sandlund, L., et al, "Magnetostriction, elastic moduli and coupling factors of composite Terfenol-D", Journal of Applied Physics, Vol. 75, 1994, pp. 5656-8.). The static macroscopic behaviour of these actuators has been characterised (Anjanappa, M. and Wu, Y, "Magnetostrictive particulate actuators: configuration, modelling, and characterisation, Smart Materials and Structures, vol. 6, 1997, pp. 393–402) and it has been observed that several parameters such as volume fraction, modulus of elasticity of a binder matrix of the compliant polymer, pre-stressing and orientation of the magnetostrictive particles play a significant role in the performance of the actuator.

The preferred embodiment of the vibration damping system 8 comprises two non-contacting coatings 12, 16. Alternatively, however, one coating 12 may overlay the other coating 16 which is applied on a surface of the body 10. The coatings 12, 16 may be interposed with one another. The magnetism generating coating 12 comprises a binder matrix 22, having elastic modulus $E_1$, and magnetostrictive particles 20 of radius $r_1$. Magnetism energy dissipating coating 16 comprises a visco-elastic magnetism energy dissipating matrix 24, having elastic modulus $E_2$, and dispersed magnetostrictive particles 18 of radius $r_2$. Preferably the visco-elastic magnetism energy dissipating matrix 24 is polyurethane but may be any visco-elastic material. The modulus $E_2$ is usually less than $E_1$ and $r_2$ is usually less than $r_1$. The magnetism energy dissipating coating 16 is preferably separate from the primary structure 10 and provides the non-contact magnetism energy dissipating medium (magnetism energy dissipating coating 16) while the primary structure 10 vibrates under external dynamic loading as, for example, in rotating discs such as compact discs, fan blades of gas turbine engines and impellers.

The internal strain in the primary structure 10 induced during vibration is first transmitted to the magnetostrictive particles 20 of magnetism generating coating 12. This generates a magnetic field which in turn induces a magnetic moment in the particles 18 of the magnetism energy dissipating coating 16 making the particles 18 vibrate in the magnetism energy dissipating matrix 24 and thus resulting in a net energy loss.

In FIG. 2, a magnetostrictive particle 18, 20, in an unconstrained state 18A, 20A, dilates to a dilated state 18B, 20B, under the effect of a magnetic field M and the free-strain along the direction of an applied magnetic field M is given by equation 1, $$d_m H = \varepsilon_f = \frac{r' - r}{r} \quad (1)$$

where $d_m$ is the magneto-mechanical constant, H is the magnetic field strength, $\varepsilon_f$ is the free-strain, r and r' being the initial and final radius along the direction of the magnetic field M. Though the magnetostriction is known to induce only extensional strains, by applying an initial field called a bias, both compressive and extensional strains can be realised. For a particle 18, 20 in a constrained medium 12, 16, the bias static strain can be derived from the theory of direct magnetostriction. The biasing magnetic field will then be related to the net strain by equation 2, $$d_m H_{bias} = \varepsilon_f - \frac{\sigma}{E^H} = \varepsilon_{bias} \quad (2)$$

where, $\varepsilon_{bias}$ is the bias strain, $\sigma$ is the elastic stress, $E^H$ is the Young's Modulus in a constant magnetic field and $H_{bias}$ is the applied magnetic field. During vibration of the primary structure 10, an additional strain $\varepsilon_v$ is produced and the resultant magnetic field is given by equation 3, $$H_{eff} = |D_{in}^{-1}(\varepsilon_v - \varepsilon_{bias})| \quad (3)$$

For a two particle system the net magnetic field is given by equation 4, $$H_{net} \propto \mu_r M_1 M_2 \left(\frac{r_1}{r_{12}}\right)^3 r_2^2 \quad (4)$$

where, $\mu_r$ is the relative magnetic field permeability between the two particles; $r_1$, $r_{12}$ and $r_2$ are respectively, the radius of the field generator magnetostrictive particle 18A, 20A, the distance between the generating particle 20 and the magnetic energy dissipating particle 18 and the radius of the magnetic energy dissipating dilated particle 18B. $M_1$ and $M_2$ are the magnetic dipole moments. The net effective magnetic field $H_{net}$ will induce magnetostrictive strain on the magnetic energy dissipating particles 18 such that:

$$\varepsilon_{induced} = d_{M2} H_{net} t \quad (5)$$

Thus for an applied strain, $\varepsilon_v$, in the magnetism generating coating 12, an induced strain $\varepsilon_{induced}$ is produced resulting in dynamic motion of the particles 18 in the magnetism energy dissipating coating 16. The magnetic energy is then converted into thermal energy as the particles 18 dilate and contract imparting work on the magnetism energy dissipating medium 16. This product, of the work done by the particles 18 on the magnetism energy dissipating medium 16, converts into thermal energy, which is then dissipated from the magnetism energy dissipating medium 16.

It is an advantage to provide cooling to the magnetism energy dissipating medium 16 to optimise working temperature. Cooling may be achieved by any conventional form of cooling and in particular by a fluid such as a flow of air or liquid over or through the magnetism energy dissipating medium 16 or its host secondary structure 14.

In consideration for designing a preferable embodiment of the present invention for any given application, it is observed in equations 4 and 5 that the magnitude of the induced strain is influenced by the following: dipole moments for the magnetostrictive particles 18, 20; magnetic field permeability; ratio $r_1/r_{12}$; geometry and size of the particles 18, 20.

Furthermore, it may be observed that the size of the particles 18 in the magnetism energy dissipating coating 16 play a significant role. Although larger particle size results in more induced strain, from a magnetism energy dissipating point of view, it would be preferable to have relatively small sized particles 18 with high volume fill fraction so that the net dissipation will be enhanced. It should also be noted that the density of the magnetostrictive particles 18, 20 in the coatings 12, 16 may be determined for each application and to attenuate a particular mode of vibration. Similarly, the thickness of the coatings 12, 16 may also be optimised for each application to provide suitable damping of the vibrating body 10.

It should also be noted that the magnetic field strength, H, derived from the magnetism generating coating 12 during vibration, reduces with distance away from the magnetism generating coating 12. Thus the effectiveness of the vibration damping system 8 is dependant on the distance between the magnetism generating coating 12 and the magnetism energy dissipating coating 16.

The preferred embodiment of the present invention and that having the most effective magnetic field generation from the Terfenol-D particles 20 in the magnetism generating coating 12, is where the particles 20 have identical magnetic orientation. This is achieved by magnetising or biasing the particles 20 of the coatings 12 by initially applying a suitable magnetic field to the coatings 12.

Referring again to FIG. 1, the primary structure or body 10, may be any industrially manufactured item which undergoes some form of machining process, for example milling, cutting, turning, drilling or grinding that may result in the body 10 vibrating. The object of the present invention being to provide vibration damping to such an item during a machining process.

It is an advantage of the present invention for the magnetism generating coating 12 and the magnetism energy dissipating coating 16 to be as close as possible to give the greatest vibration damping available. It is also an advantage for the magnetism generating coating 12 and the magnetism energy dissipating coating 16 to be applied to separate structures 10, 14, so that cooling may be applied to the magnetism energy dissipating coating 16. It may also be an advantage in a high temperature environment or where the magnetism generating coating 12 is heated, to position the magnetism energy dissipating coating 16 further away from the magnetism generating coating 12 so that the magnetism energy dissipating coating 16 may be maintained at its optimum operating temperature.

In FIG. 3 the non-contact vibration damping system 8 may be applied to a tool 26 driven by a machine 28. In this case the tool 26 is a milling tool. The magnetism generating coating 12 and magnetism energy dissipating coating 16 may be applied to both the workpiece 10 and the machine tool 26. Where the vibration damping system 8 is applied to the tool 26, the tool 26 is coated with the magnetism generating medium 12 and substantially surrounded and separated a distance apart from the magnetism energy dissipating medium 16, which is itself coated to a substantially annular secondary structure 30.

Similarly, but not shown, the vibration damping system 8 may be equally applied to the machine 28 or a combination of both the tool 26 and the machine 28.

Referring to FIG. 4, the vibration damping system 8 may be also applied to other mechanical devices, for example a component of a gas turbine engine 32 which is susceptible to vibration such as a compressor blade 34, stator vane 36, a disc 38, a blisk, a bling, an engine casing or an accessory. The vibrations imparted on the vibrating component 34, 36, 38 to be damped may be attributable to rotational out of balance forces for example. These out of balance forces are as a result of a mass imbalance or an aerodynamic loading imbalance and are well known in the art of aero-engine design. In this embodiment the magnetism energy dissipating medium 16 may be applied to a static structure such as a casing 40 surrounding an annular array of radially extending blades 34, themselves coated, either wholly or in part, with magnetism generating medium 12.

However, the primary structure 10 also may be damped to suppress airborne noise, for example in relation to aero-engine blades 34, stator vanes 36 and other aerofoils. The primary structure 10 may also be a compact disc, a read/write laser system, a machine drive shaft, components of aircraft such as flaps and other bodies having weight and shape restrictions. The present invention is particularly applicable in hot environments and to hot components such as fuel pipes as the magnetism energy dissipating medium 16 may be disposed a distance away from the fuel pipe itself and cooling means may be readily provided to the magnetism energy dissipating medium 16 or the secondary structure 14.

Referring to FIG. 5, which shows a second generalised application of the present invention, where the present invention does not require a non-contacting damping system 8, the magnetism energy dissipating coating 16 is applied directly to the magnetism generating coating 12 on the primary structure 10. In this example the primary structure 10 may be a thin shell structure such as a metallic air conditioning duct.

Furthermore, other embodiments of the present invention may easily be made, but are intended to be within the scope of the present invention. For example, the magnetism generating medium 12 may be applied to part of the body 10 to be damped or all of the body 10 or primary structure 10. The magnetism energy dissipating medium 16, applied to part or all of the secondary structure 14 and the secondary structure 14 may surround some or all of the body 10. A plurality of secondary structures 14 may be provided, each secondary structure 14 may have substantially the same magnetism energy dissipating coating 16 or alternatively different magnetism energy dissipating coatings 16 each adapted to damp vibrations of different frequencies. The magnetism energy dissipating coatings 16 may vary in the size of the particles, the thickness of the coating, the elastic modulus of the visco-elastic magnetism energy dissipating matrix 24. The magnetism energy dissipating medium 16 may comprise layers or discrete regions of coatings, each coating adapted to damp a range of vibratory frequencies.

A further example of the application of this system to damp vibrations of a primary structure 10 is for reducing the noise of vehicular traffic. In this example the carriageway is lined with panels, each panel being coated with the magnetism generating coating 12 and in juxtaposition with a secondary structure 14 having a coating of magnetism energy dissipating medium 16. Thereby, the acoustic vibrations of the panel may be absorbed and not merely reflected. This may also be used along runways at airports to attenuate the noise of aircraft. A preferred embodiment of this example is where the magnetism generating coating 12 is of sufficient integrity to form the panel itself, the magnetism energy dissipating coating 16 then being applied to the magnetism generating medium 12.

Figure 6:
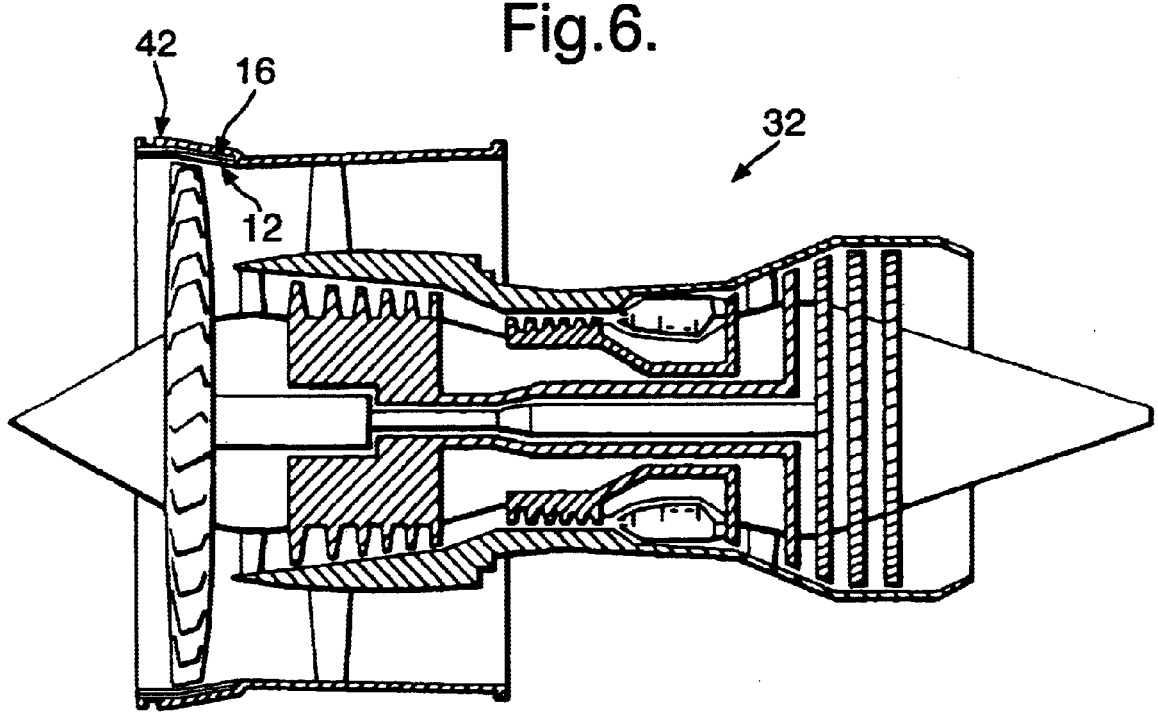
FIG. 6 shows a fifth embodiment of the present invention.

A further application for absorbing acoustic vibrations is to apply the coatings 12, 16 directly to a primary structure. The coatings 12, 16 overlay each other on the primary structure. For example, and as shown on FIG. 6, the low pressure fan casing 42 of a gas turbine engine 32 which conventionally comprises a noise suppressing liner (not shown) is replaced by the magnetism generating coating 12 overlaying the magnetism energy dissipating coating 16. In this example it is the magnetism generating coating 12 that is directly excited by acoustic vibrations. Furthermore, it is possible for the magnetism generating coating 12, overlaid with the magnetism energy dissipating coating 16, to form part of or all of a containment casing, as known in the art, to retain a fan blade in the event of a fan blade off incident.

The present invention also relates to a method of damping vibrations wherein the method comprises the steps of: disposing a magnetism generating medium to a body; applying a magnetism energy dissipating medium to a secondary structure; disposing the secondary structure in proximity to the body so that the magnetism generating coating and the magnetism energy dissipating medium are so disposed with respect to each other that the magnetic field is then dissipated by the magnetism energy dissipating medium thereby damping the vibrations of the body. Furthermore, the method of damping vibrations may comprise the further step of providing cooling to the magnetism energy dissipating medium to optimise operational temperature of the magnetism energy dissipating medium. Alternatively, the method of damping vibrations comprises the further step of providing cooling the secondary structure.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A vibration damping system wherein the system comprises a magnetism generating medium and a magnetism energy dissipating medium whereby, in use, vibrations of the magnetism generating medium generate a magnetic field, the magnetism generating medium and the magnetism energy dissipating medium being so disposed with respect to each other that the magnetic field is then dissipated by the magnetism energy dissipating medium thereby damping the vibrations of the magnetism generating medium, the magnetism generating medium comprising a matrix and a plurality of magnetostrictive particles dispersed within the matrix and the magnetism energy dissipating medium comprises another matrix and a plurality of magnetostrictive particles dispersed within the said another matrix.

2. A vibration damping system as claimed in claim 1 wherein the system comprises a body, the magnetism generating medium is applied to the body, so that, in use, when the body vibrates a magnetic field is generated by the magnetism generating medium, the magnetism generating medium and the magnetism energy dissipating medium being so disposed with respect to each other that the magnetic field is then dissipated by the magnetism energy dissipating medium thereby damping the vibrations of the body.

3. A vibration damping system as claimed in claim 2 wherein a secondary structure is provided, the magnetism energy dissipating medium is applied to the secondary structure and the secondary structure, in use, is in proximity to the body such that the vibrations of the body are damped.

4. A vibration damping system as claimed in claim 2 wherein a secondary structure is provided, the secondary structure comprises magnetism energy dissipating medium and, in use, is in proximity to the body such that the vibrations of the body are damped.

5. A vibration damping system as claimed in claim 1 wherein the magnetism energy dissipating medium is applied to the magnetism generating medium.

6. A vibration damping system as claimed in claim 1 wherein the magnetism generating medium comprises magnetostrictive material.

7. A vibration damping system as claimed in claim 1 wherein the magnetostrictive particles comprises any one or more of the magnetic transition elements.

8. A vibration damping system as claimed in claim 1 wherein the magnetostrictive particles comprises any one or more of the rare earth materials.

9. A vibration damping system as claimed in claim 1 wherein the magnetostrictive particles comprises 30% Terbium, 70% Dysprosium and trace Iron.

10. A vibration damping system as claimed in claim 1 wherein the magnetism generating medium includes magnetostrictive material; the magnetostrictive particles and the magnetostrictive material each comprise any one or more of the rare earth elements and any one or more of the magnetic transition elements.

11. A vibration damping system as claimed in claim 1 wherein the matrix comprises a visco-elastic magnetism energy dissipating matrix.

12. A vibration damping system as claimed in claim 11 wherein the magnetism energy dissipating matrix comprises polyurethane.

13. A vibration damping system as claimed in claim 1 wherein the magnetism energy dissipating medium includes a visco-elastic magnetism energy dissipating matrix and the magnetism generating medium comprises a binder matrix, the binder matrix having an elastic modulus greater than the elastic modulus of the visco-elastic magnetism energy dissipating matrix.

14. A vibration damping system as claimed in claim 1 wherein each of the magnetostrictive particles has substantially the same magnetic orientation as the remainder thereof.

15. A vibration damping system as claimed in claim 1 wherein each of the magnetostrictive particles is oriented substantially in the direction of the magnetic field.

16. A vibration damping system as claimed in claim 1 wherein the magnetostrictive particles are of the same size.

17. A vibration damping system as claimed in claim 1 wherein the vibrations imposed on the magnetism generating medium are derived from a machining process.

18. A vibration damping system as claimed in claim 1 wherein the vibrations imposed on the magnetism generating medium are derived from an acoustic source.

19. A vibration damping system as claimed in claim 2 wherein the body is any one of the primary structure, the machine, the tool or any industrially manufactured item which undergoes some form of machining process.

20. A vibration damping system as claimed in claim 2 wherein the body is a component of a gas turbine engine.

21. A vibration damping system as claimed in claim 2 wherein the body is a component of an aircraft.

22. A vibration damping system as claimed in claim 2 wherein the body is a vibrating rotating body.

23. A vibration damping system as claimed in claim 1 wherein the magnetism generating medium is any one of the primary structure, the machine, the tool or any industrially manufactured item which undergoes some form of machining process.

24. A vibration damping system as claimed in claim 1 wherein the magnetism generating medium is a component of a gas turbine engine.

25. A vibration damping system as claimed in claim 1 wherein the magnetism generating medium is a component of an aircraft.

26. A vibration damping system as claimed in claim 1 wherein the magnetism generating medium is a vibrating rotating body.

27. A method of damping vibrations of a body wherein the method comprises the steps of:

(i) applying a magnetism generating medium to a body in the form of a coating that generates a magnetic field;

(ii) applying a magnetism energy dissipating medium to a secondary structure;

(iii) disposing the secondary structure in proximity to the body so that the magnetism generating coating and the magnetism energy dissipating medium are so disposed with respect to each other that the magnetic field is then dissipated by the magnetism energy dissipating medium thereby damping the vibrations of the body.

28. A vibration damping system wherein the system having parts comprises a magnetism generating medium and a magnetism energy dissipating medium whereby, in use, vibrations of the magnetism generating medium generate a magnetic field, the magnetism generating medium and the magnetism energy dissipating medium being so disposed with respect to each other that the magnetic field is then dissipated by the magnetism energy dissipating medium thereby damping the vibrations of the magnetism generating medium, the magnetism generating medium comprising a matrix and a plurality of magnetostrictive particles dispersed within the matrix and the magnetism energy dissipating medium comprises another matrix and a plurality of magnetostrictive particles dispersed within the said another matrix, said matrix of said magnetism generating medium being in the form of a coating applied to at least one the parts of the system.

29. The vibration damping system of claim 28 Wherein said another matrix is in the form of a coating applied to another of the parts of the system.

30. The vibration damping system of claim 28 wherein at least one of said matrices is made from a visco-elastic medium.

* * * * *